Oct. 8, 1940.  H. L. CARROLL  2,217,101
SINKER SUPPORT FOR FISHING LINES
Filed May 1, 1940
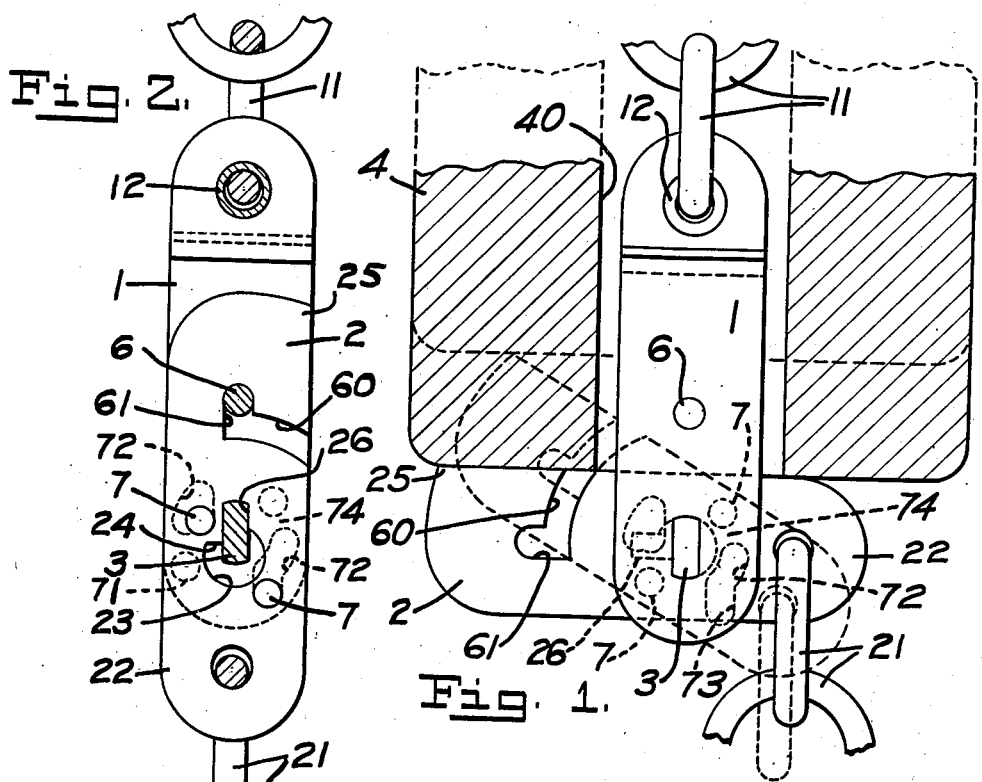
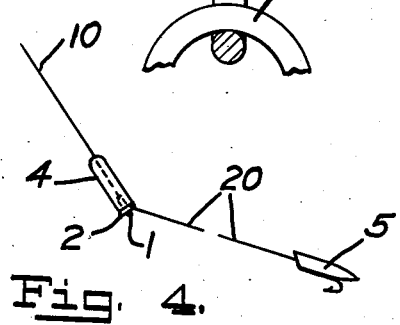
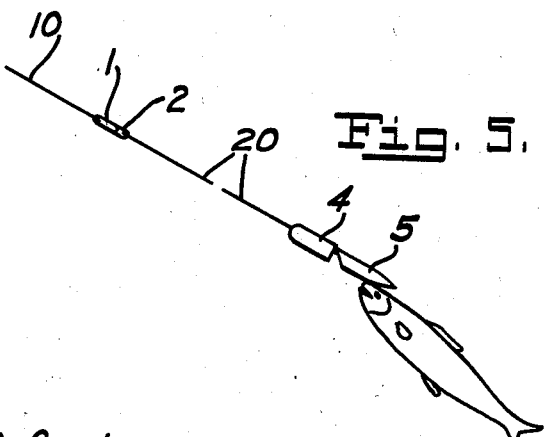
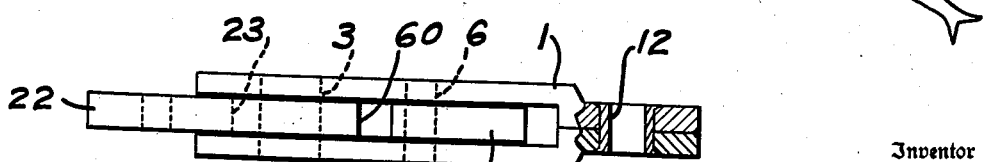
Inventor
Homer L. Carroll
By Reynolds & Beach
Attorney Patented Oct. 8, 1940

2,217,101

UNITED STATES PATENT OFFICE 2,217,101

SINKER SUPPORT FOR FISHING LINES

Homer L. Carroll, Seattle, Wash.

Application May 1, 1940, Serial No. 332,743

16 Claims. (Cl. 43—27)

My invention relates to fishing tackle, and is particularly intended for use in trolling.

Rod and reel are used by sportsmen in trolling for salmon, which are often at a considerable depth. To get the lure down to the proper depth it is necessary to employ an appreciable weight of lead as a sinker (perhaps seven to sixteen ounces) to insure that the lure (a plug, spoon, etc.) is drawn down to the proper depth. It is not feasible to locate this sinker at the lure itself, for it would interfere with the lure's attraction, and distract or scare off the fish. The lure should trail out, perhaps thirty feet behind the sinker, so that the sinker is not visible. Also the lure thus may have its proper motion as it is drawn through the water.

When a fish has been hooked and drawn up to the boat, to be landed, a further difficulty arises if the sinker remains thirty feet ahead of the plug. The sinker can not be drawn through the pole's tip guide, which is frequently as small as one-fourth inch. Consequently the fish cannot be brought close to the boat, for landing, unless the balance of line is pulled in by hand, and that is impracticable.

To effect release of the sinkers, a looped wire grip has been employed, on sinkers, to hold a bight of the line, and this frictional grip is arranged to be released by a pull on the line, sufficient to straighten it. This releases the sinker, threaded on the line, and it slides down to the plug, leaving the line free to run through the tip guide without hindrance.

Objections have been raised to these self-releasing grips. If a wire line is used, they release too readily; if a cuttyhunk line is used, they sometimes fail to release, and, since the sinker can not be drawn through the tip guide, and blocks the reeling in of the last thirty feet or so of line, the fisherman must reach out, if he can, and release the sinker, or haul the fish in by hand.

It is my object to provide a sinker support so constructed and arranged that there can be no possibility either of failure to support the sinker, or to release the sinker when a fish is hooked, and to do this by an arm pivoted to extend crosswise of the line, for support of the sinker, and so connected that a pull tends to align it with the line, for release.

The crosswise arm will align itself with the line, in which it is permanently secured, by a pull on the lower portion of the line, but in reeling in, with the line at right angles to the pole, the arm will occasionally swing crosswise as it reaches the tip guide, thereby preventing further reeling in. In such case the sinker might as well have been left where it was, for unless the sinker support will run freely in and out through the tip guide, and through the supplemental guides along the pole, without interference, it has failed in its primary purpose, which is to remove all obstructions to reeling in the line practically all the way to the lure.

It is a further object of this invention to provide a sinker support like that described above, which will be self-releasing to allow the sinker to slip downward past it, but which when thus released will be self-locking, and which cannot accidentally come unlocked nor move into a position where it can by any possibility obstruct the free running of the line through the tip guide or any other line guides on the pole.

More specifically it is an object to provide for such a purpose a pair of arms pivotally connected and so arranged that they may be disposed in crosswise position, to support a sinker, but which by a pull upon the lower portion of the line will be moved automatically into aligned position (in which position they are too small to interfere with line guides), and at the same time will be locked in aligned position, where they will be held rigidly and cannot swing crosswise, or from their aligned position, while being reeled in. Conscious manual effort is required to unlock them, by pushing them together.

Among other objects are: to provide frictional means which will hold the arms in the crosswise position, notwithstanding tendencies arising sometimes, with light lines and with light sinkers in rough water, from the resilience of the line, to jounce the sinker up and down and to permit the arms to move into aligned position; to provide stop means to limit the rotative movement of the arms into crosswise position; to provide a second locking means coordinated with the first, making more secure the locking and lessening the stress on the principal locking means; to provide a sinker support of the general character indicated, which is simple and inexpensive and easy to manufacture, and of a design which will permit the obtaining of whatever leverage or moment arm may be required, so that the force required to effect movement into aligned position may be, if desired, rather appreciable.

With these and other objects in mind, as will appear as this specification progresses, my invention comprises the novel parts and the novel combination and arrangement thereof, as shown in the accompanying drawing, described in this specification, and as will be more particularly defined by the claims which terminate the same. The drawing illustrates a representative form, and it will be understood that various changes may be made in the form, character, and relative arrangement of the parts without departure from my invention as hereinafter defined in the claims.

Figure 1 is an elevation of the device, with parts shown in the crosswise position, and illustrating the relationship of the sinker thereto, and illustrating in dash lines the action as the parts move toward aligned position.

Figure 2 is a section on a median plane, showing the parts in their aligned position.

Figure 3 is an edge view of the parts in the aligned position, a detail being shown in section.

Figure 4 is a diagram of the manner of use of the device, illustrating a relative position of parts during trolling, and Figure 5 is a similar view, showing the position of the parts when a fish has been hooked.

In principle the invention comprises simply an arm which is pivoted between its ends, the pivot support depending from the upper portion of the line, and one end of the arm is connected to the lower portion of the line, so that a pull on the line, tending to straighten it, moves the arm from crosswise position into alignment with the two parts of the line. Preferably there is always coupled with such an arm a locking means automatically operable when parts reach aligned position. The locking means may be actuated by relative longitudinal movement of the arm and the line to effect locking of the arm in this aligned position. In the crosswise position the arm supports a sinker, threaded on the line, from below; in the aligned position the sinker slides downwardly past the arm. Any desired leverage effect can be secured by variation of the location of the pivot support, it being remembered that the sinker must be lifted as the arm swings towards aligned position. Conveniently the upper portion of the line terminates in another arm, which furnishes the pivot support for the one first mentioned. The two arms when thus locked together may not be disengaged except by relative longitudinal movement in the direction exactly opposite to the movement which is induced by tension, and the line is always under tension while in use.

In the form illustrated the upper portion 10 of the line is connected through any suitable swivel or ring connections, generally indicated at 11, to an arm 1. Preferably this arm is bifurcated, as may be seen best in Figure 3, the two separately formed parts being joined permanently by means such as the hollow rivet 12, within which the final ring 11 is secured. A second arm 2 is pivotally connected between its ends to the lower end of the arm 1. To this end one of these arms, for instance the arm 1, is provided with a generally rectangular pivot support 3, and the other arm, in this instance the arm 2, is provided with a pivot aperture 23 embracing the pivot support 3 and permitting relative rotation when the two are in proper relationship, as shown in Figure 1. One end of the second arm 2, for instance the short end 22, is connected to the lower portion 20 of the line, again through the interposition of suitable rings or swivels indicated at 21.

By the arrangement described, when the arms 1 and 2 are crosswise, as in Figures 1 and 4, a sinker 4, threaded upon the upper portion 10 of the line, rests upon the second arm 2, and the major portion of the first arm 1 lies within the bore 40 of the sinker. This bore 40 is sufficiently large, and the arms are so shaped, that when the arms 1 and 2 are aligned they and their connections 11 and 21 will slide freely through the bore. In the crosswise position the lower portion 20 of the line is not aligned with the upper portion 10, but is offset somewhat, as is best seen in Figure 1. A stop shoulder 24, formed in the pivot aperture 23, engages the generally rectangular pivot support 3, to locate the parts properly in this crosswise position, but when a pull occurs upon the lower portion of the line, as for example, when a fish takes the lure 5, the arms rotate towards aligned position. The rotation of the parts moves the shoulder 24 away from the pivot support 3, until the arms 1 and 2 reach an aligned position. As they move towards this aligned position the point 25 of the arm 2 must force the sinker 4 upwardly, and the moment arms for the connections 21 and for the point 25, respectively, may be so arranged that an appreciable pull is required on the lower portion of the line before a sinker of a given weight will be moved upwardly sufficiently to permit the arms 1 and 2 to come into their aligned position.

The pivot aperture 23 is likewise provided with an extension 26, so located with respect to the non-rotative and generally rectangular pivot support 3 that when the parts are in aligned position the arm 2 will slide lengthwise relative to the arm 1, the pivot support 3 entering the extension 26, and being closely embraced therein. The parts assume this position automatically, as they reach aligned position, the relative lengthwise movement resulting from tension in the line. When parts are in this position, as shown in Figure 2, relative rotation of the arms is not possible, nor is it possible, accidentally, to move the arms 1 and 2 in the reverse lengthwise direction to disengage the pivot support 3 from the extension 26. All the pull on the line is in the opposite direction, even though the arms be also subject to bending stress in any direction as they pass over or through a tip guide. This tends to hold them thus locked. As a result, when the fish is reeled in, the aligned arms 1 and 2, being sufficiently small, will slip through the tip guide, and regardless of the angle of pull with respect to the pole, cannot possibly come unlocked and moved into a crosswise position, and thus block the reeling in of the line by engagement of the arm 2 with the tip guide.

As a further locking means, and to strengthen the device and relieve the pivot support 3 of a part of the strain, I may provide additional locking means, such as the locking pin 6 which is carried by one of the arms, as 1, and which engages, as the arms rotate toward aligned position, with an arcuate slot 60 in the other arm 2. This arcuate slot 60 is likewise provided with a longitudinal extension 61 which permits the locking pin 6 to move lengthwise into the extension, and thus to cooperate with the pivot support 3 embraced by the extension 26 to prevent relative rotational movement of the arms.

Unless some means more than the stop shoulder 24 is provided to hold the arms in their crosswise position, it will sometimes happen in rough water, and with a flexible or extensible line, that the jiggling due to the wave action will permit the sinker 1 to rise sufficiently that the arms may swing into aligned position, whereupon the sinker slides down to the plug, and the line must be hauled up to reset it. Accordingly I prefer that there be provided means to apply some slight frictional resistance to movement of the parts from the crosswise position, though after the initial resistance has been overcome I prefer that they swing freely without further resistance. To such an end I provide one or more dimples 7, preferably in the arm 2, which when the parts are in crosswise position is received in a positioning recess 71 in the arm 1, and which when the arms are swung about the pivot support is moved into an arcuate recess 72 provided with a longitudinal extension 73 corresponding to the extensions 26 and 61, and for the same purpose, namely, to permit relative longitudinal movement of the parts after they have reached aligned position. It is only necessary for the dimple 7 to ride from the depression 71, over the high spot 74, and into the depression 72, 73. The initial resistance is encountered in the movement over the high spot 74, and the resilient nature of the bifurcated member 1, which straddles the member 2, provides sufficient resistance to the desired end. The connections at 3 and 6, across the furcation of the arm 1, may be sufficiently loose to prevent undue binding.

What I claim as my invention is:

1. A sinker support for connection between the ends of a fishing line, comprising means formed for connection in the run of the line, and engageable beneath a sinker through which the line is threaded, to support the sinker, said means being organized and arranged to be moved under the influence of a pull on the line, at the hook, into non-supporting position, such that the sinker slips downward therepast along the line.

2. A sinker support for connection between the ends of a fishing line, comprising means formed for connection in the run of the line, and engageable beneath a sinker through which the line is threaded, to support the sinker, said means being organized and arranged to be moved under the influence of a pull on the line, at the hook, into non-supporting position, such that the sinker slips downward therepast along the line, and locking means operable automatically upon movement of said means into non-supporting position, to secure it in such position.

3. A sinker support for connection between the ends of a fishing line, comprising an arm pivotally supported, between its ends, from the upper portion of the line, the lower portion of the line being connected to one end of the arm, the arm being swingable about its pivot support from a crosswise position, wherein it will support a sinker which is threaded upon the upper portion of the line, into an aligned position, wherein the sinker will slide downwardly thereover, and being movable into such aligned position by a pull on the lower portion of the line.

4. A sinker support for connection between the ends of a fishing line, comprising an arm pivotally supported, between its ends, from the upper portion of the line, the lower portion of the line being connected to one end of the arm, the arm being swingable about its pivot support from a crosswise position, wherein it will support a sinker which is threaded upon the upper portion of the line, into an aligned position, wherein the sinker will slide downwardly thereover, and being movable into such aligned position by a pull on the lower portion of the line, and locking means automatically operable upon movement of the arm into aligned position, to retain it in such aligned position.

5. A self-releasing sinker support for connection between the ends of a fishing line, comprising a first arm depending by one end from, and aligned with, the upper portion of the line, a second arm pivotally supported between its ends from the first arm, whereby it may be disposed crosswise of the first arm to support thereabove a sinker which is threaded upon the line, the lower portion of the line being connected to one end of the second arm, and therefore out of alignment with the upper portion of the line when the second arm is in its crosswise position, and whereby a sufficient pull on the lower portion of the line will pull the arms and the upper and lower portions of the line into alignment, to permit the sinker to slide downward past the now aligned arms.

6. A self-releasing sinker support for connection between the ends of a fishing line, comprising a first arm depending by one end from, and aligned with, the upper portion of the line, a second arm pivotally supported between its ends from the first arm, whereby it may be disposed crosswise of the first arm to support thereabove a sinker which is threaded upon the line, the lower portion of the line being connected to one end of the second arm, and therefore out of alignment with the upper portion of the line when the second arm is in its crosswise position, and whereby a sufficient pull on the lower portion of the line will pull the arms and the upper and lower portions of the line into alignment, to permit the sinker to slide downward past the now aligned arms, and locking means automatically engageable between the arms upon their movement into aligned position.

7. A self-releasing sinker support for connection between the ends of a fishing line, comprising a first arm depending by one end from, and aligned with, the upper portion of the line, a second arm pivotally supported between its ends from the first arm, whereby it may be disposed crosswise of the first arm to support thereabove a sinker which is threaded upon the line, the lower portion of the line being connected to one end of the second arm, and therefore out of alignment with the upper portion of the line when the second arm is in its crosswise position, and whereby a sufficient pull on the lower portion of the line will pull the arms and the upper and lower portions of the line into alignment, to permit the sinker to slide downward past the now aligned arms, locking means interengageable between the two arms, and organized and arranged to engage by their movement into aligned position and by subsequent relative downward movement of the second arm, the pivotal support between the arms being likewise organized and arranged to allow such downward movement when the two arms are aligned.

8. A sinker support for connection between the ends of a fishing line, comprising two members organized and arranged, one for connection to one part of the line, and the other for connection to the other part of the line, means connecting said members for relative movement from a supporting position of such transverse extent that a sinker may not slide thereover, by tension upon the line into a collapsed position wherein their transverse extent is small enough that a previously supported sinker may slide thereover.

9. A sinker support for connection between the ends of a fishing line, comprising two members organized and arranged, one for connection to one part of the line, and the other for connection to the other part of the line, means connecting said members for relative movement from a supporting position of such transverse extent that a sinker may not slide thereover, by tension upon the line into a collapsed position wherein their transverse extent is small enough that a previously supported sinker may slide thereover, and means automatically operable upon movement of said members into collapsed position to lock and hold them in such collapsed position.

10. A self-releasing sinker support for connection between the ends of a fishing line, comprising a first arm depending by one end from, and aligned with, the upper portion of the line, a second arm pivotally supported between its ends from the first arm, whereby it may be disposed crosswise of the first arm to support thereabove a sinker which is threaded upon the line, the lower portion of the line being connected to one end of the second arm, and therefore out of alignment with the upper portion of the line when the second arm is in its crosswise position, and whereby a sufficient pull on the lower portion of the line will pull the arms and the upper and lower portions of the line into alignment to permit the sinker to slide downward past the now aligned arms, and means imposing a given initial resistance to relative pivotal movement of the arms.

11. A self-releasing sinker support for connection between the ends of a fishing line, comprising a first arm depending by one end from, and aligned with, the upper portion of the line, a second arm pivotally supported between its ends from the first arm, whereby it may be disposed crosswise of the first arm to support thereabove a sinker which is threaded upon the line, the lower portion of the line being connected to one end of the second arm, and therefore out of alignment with the upper portion of the line when the second arm is in its crosswise position, and whereby a sufficient pull on the lower portion of the line will pull the arms and the upper and lower portions of the line into alignment, to permit the sinker to slide downward past the now aligned arms, locking means interengageable between the two arms, and organized and arranged to engage by their movement into aligned position and by subsequent relative downward movement of the second arm, the pivotal support between the arms being likewise organized and arranged to allow such relative downward movement when the two arms are aligned, means to impose an initial resistance to relative pivotal movement of the arms, and cooperating means to relieve such resistance during continued rotative and lengthwise movement.

12. A self-releasing sinker support for connection between the ends of a fishing line, comprising a first arm arranged to depend by its upper end from, and aligned with, the upper portion of the line, and carrying a generally rectangular pivot support adjacent its lower end, a second arm having a pivot aperture between its ends receiving said pivot support, for rotation of the second arm from a crosswise position to an aligned position, said pivot aperture having a lengthwise extension positioned to receive the rectangular pivot support, when the arms are aligned, for relative lengthwise movement of the arms, one end of the second arm, spaced from the pivot axis, being arranged for connection to the lower portion of the line, whereby a pull upon such lower portion of the line will swing the second arm from crosswise position to aligned position, and will then effect locking engagement between the arms, by relative lengthwise movement, of the pivot support and the pivot aperture's extension.

13. The combination of claim 12, characterized in that one of said arms is provided with a locking pin, located outwardly of the pivot axis, and the other arm is provided with an arcuate slot disposed to receive the locking pin as the arms swing from crosswise position towards aligned position, said arcuate slot having a lengthwise extension closely receiving the locking pin, and of a length corresponding to the length of the lengthwise extension of the pivot aperture.

14. The combination of claim 12, characterized in that one of the arms is provided with a friction dimple, and the other with a recess positioned to receive the dimple and to hold the arms yieldingly in crosswise position, the recessed arm having also an arcuate recess concentric with the pivot support, having a lengthwise extension corresponding to the lengthwise extension of the pivot aperture, whereby, after overcoming initial resistance to movement from crosswise position, the dimple rides freely, without resistance, in the arcuate recess and its extension during the remainder of the relative movement of the arms into locked position.

15. The combination of claim 12, characterized in that the pivot aperture is formed with a stop shoulder positioned to engage the pivot support, to retain the arms in crosswise position.

16. The combination of claim 12, characterized in that the first arm is bifurcated immediately below its upper end, and straddles the second arm, the arms being provided, the one with friction means, near its lower end engageable with the other arm to retain them in crosswise position, and the other with relieving recesses shaped to receive said friction means, after initial resistance has been overcome, and to permit unrestrained movement to their final locked position.

HOMER L. CARROLL.